E. R. GREER.
ROAD ROLLER.
APPLICATION FILED APR. 1, 1913.
1,129,863.
Patented Mar. 2, 1915.
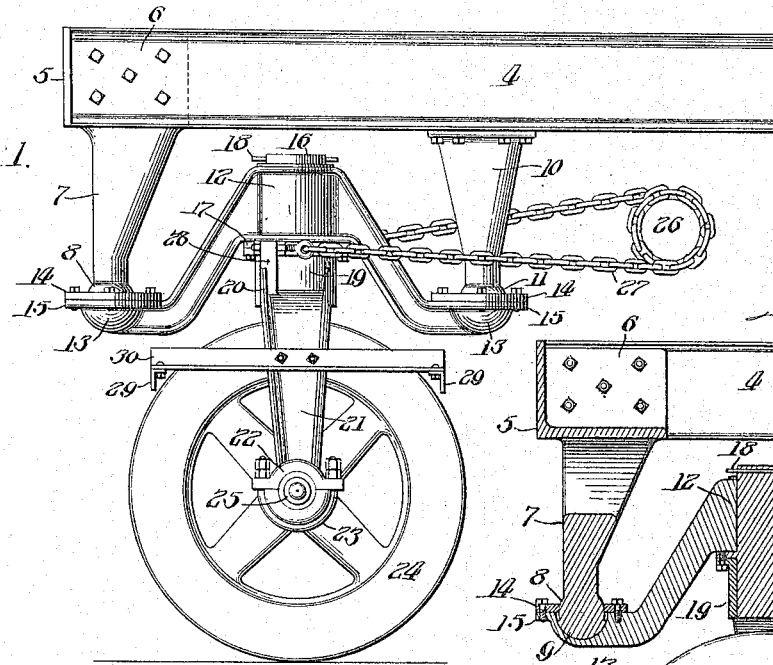
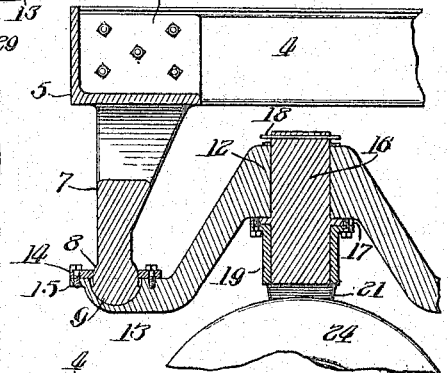
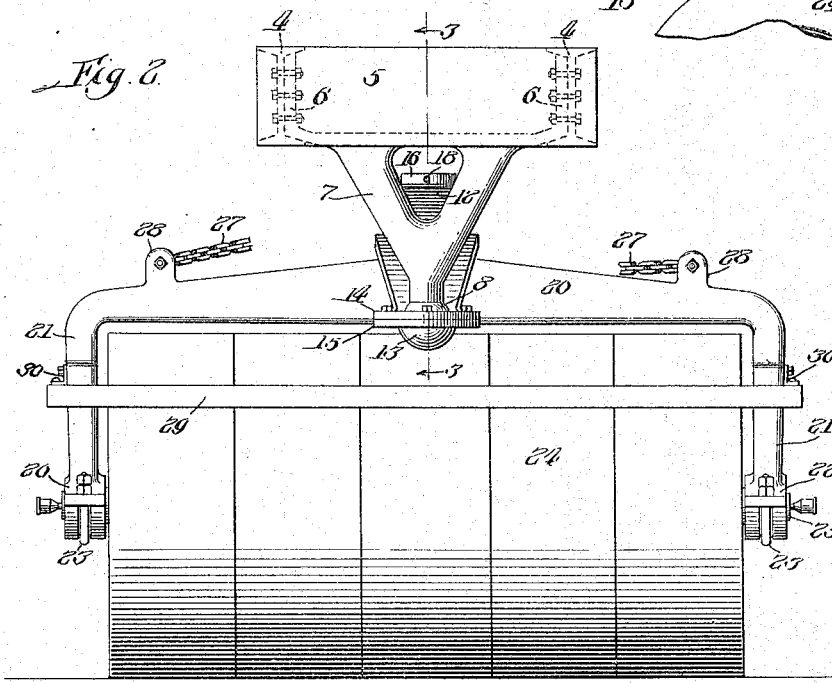
Witnesses:
John H. McCanna Jr.
E. Behel.
Inventor:
Edward R. Greer
By A. O. Behel
Atty.
THE NORRIS PETERS CO., PHOTO-LITHO., WASHINGTON, D. C.

UNITED STATES PATENT OFFICE.

EDWARD RUSSELL GREER, OF MINNEAPOLIS, MINNESOTA, ASSIGNOR TO EMERSON-BRANTINGHAM COMPANY, OF ROCKFORD, ILLINOIS, A CORPORATION OF ILLINOIS.

ROAD-ROLLER.

1,129,863.   Specification of Letters Patent.   Patented Mar. 2, 1915.

Application filed April 1, 1913. Serial No. 758,186.

*To all whom it may concern:*

Be it known that I, EDWARD R. GREER, a citizen of the United States, residing at Minneapolis, in the county of Hennepin and State of Minnesota, have invented certain new and useful Improvements in Road-Rollers, of which the following is a specification.

This invention relates in general to self-propelled vehicles known as traction engines, and more particularly to the means for mounting the dirigible wheel or wheels at the front of the machine.

It is well known to those familiar with this art that self-propelled vehicles used variously, especially for operating farm machinery and for use in building roads, known as "tractors" and "road-rollers," are constructed along very similar lines. A distinguishing difference, however, lies in the construction of their dirigible wheel or wheels. It has been found very desirable to equip self-propelled vehicles with such front wheel mountings that either a pair of steering supporting wheels ordinarily used with tractors or a single road-rolling wheel as used with road-rollers may be easily attached to the front of the vehicle, thus permitting the same to be used effectively for both tractor and road-rolling purposes. My invention, primarily, aims to provide means for permitting this change of front wheels for the purpose described. I also aim to provide wheel-mounting means of the above described character adapted particularly for a road-roller wheel, and to embody novel features of construction in said means for permitting easy changeability of wheels as above mentioned, and for insuring strength and rigidity to the wheel-mounting means.

Another object is to provide such wheel-mounting means as will permit the use with a tractor, without changing the front wheel-mounting, of a road-roller dirigible wheel having as large a diameter as possible. It is evident that to accomplish this feature without changing the frame or frame-connected wheel mountings, a novel structure must be devised.

With the foregoing objects in view I have provided wheel-mounting means which comprise, preferably, a pair of supports substantially similar in structure, depending rigidly from the frame spaced apart on the longitudinal axis thereof and provided at their lower ends with ball members. The forward support is the same as is used with traction engines employing a wheel-supported axle mounted in a ball-and-socket connection on said support to guide the vehicle. Interposed between and mounted upon supports in ball-and-socket connection is a yoked frame having a vertical axis journaled bearing located above the said ball-and-socket connections. A road-roller wheel yoke of any well known or preferred construction is journaled in the bearing of said yoked frame to guide the vehicle.

In the accompanying drawings, Figure 1 is a side elevation of my improved roller attachment as applied to the forward end of the main frame of a traction engine. Fig. 2 is a front view of the traction engine as shown in Fig. 1. Fig. 3 is a vertical section on the line 3—3 of Fig. 2.

I have illustrated only those parts of a traction engine frame necessary to explain my invention. The main frame comprises the two longitudinal channel-beams 4 which will be seen extend above and to the front end of the dirigible wheel. The channel-beams are connected at their forward ends by the head 5 having formed therewith wing extensions 6 to which the channel-beams are bolted, and the centrally disposed depending girt 7 which has formed at its lower end a ball-member 8, the under side 9 of the ball being formed with a greater radius as is shown in Fig. 3. In the use of the traction engine for hauling purposes or in connection with farm machinery of various kinds, an axle (not shown) is mounted upon the ball-member 8 in a ball-and-socket connection to permit the axle to turn on a vertical axis for guiding the tractor and on a horizontal axis when going over uneven ground. To provide for mounting a road-roller wheel and at the same time utilize the mounting above mentioned, a second cross-head is bolted to the under side of channel-beams 4 to the rear of cross-head 5, has a depending girt 10 disposed centrally in alinement with girt 7, and has a ball member 11 formed at its end similar to ball member 8. A yoked truss or frame is disposed between the girts extending longitudinally with the frame, has a vertical cylindrical head 12 form ng a journal bearing and has its arms formed with sockets 13 in which are located ball members 8 and 11, the ball-and-socket members being held together by rings 14 bolted to the peripheral flanges 15 formed with the sockets. A king-bolt 16 formed with a peripheral flange 17 is journaled in the head 12 of the truss yoke and has a pin 18 through its upper projecting end. The lower end of king-bolt 16 is mounted in the central head 19 of the roller yoke 20 and is bolted thereto through its peripheral flange.

The depending arms 21 of the roller-yoke carry at their lower ends the split journal bearings 22, having the lower detachable bearing blocks held in position by the U-bolts 23. The roller-wheel 24 carries the axle 25 which is mounted in the journal bearings 22. A steering drum 26, the actuation of which may be by suitable means, has a chain connection 27 with lugs 28 located on each side arm of the roller-yoke. Scrapers 29 are supported by the angle-bars 30 bolted to the depending arms of the roller-yoke.

By rotating the steering drum in either direction the chain is wound thereupon, thereby pivoting the roller-yoke and king-bolt from the truss head and turning the roller-wheel to the right or left to guide the road-roller. The truss yoke and roller-yoke are rigidly connected as regards any lateral movement, but the truss-yoke by its socket connections is capable of a vertical pivotal movement from said connections in a plane transverse to the frame of the road-roller, thus allowing the roller-wheel to assume various angles in said plane when running over uneven ground.

I claim as my invention.

1. In a traction engine, the combination with a frame, of a front and rear support depending from the frame and each having a ball member at its lower end, a member disposed intermediate said supports and having socket portions in connection with said ball members, a roller-yoke pivotally mounted on a vertical axis on said intermediate member, and a roller-wheel journaled in said roller-yoke.

2. In a traction engine, the combination with a frame, of a roller-wheel, a roller-yoke supported by the wheel, a yoked truss in which said roller-yoke is pivotally mounted on a vertical axis, the yoke truss having its arms pivotally connected on horizontal axes to the frame at the front and rear of the periphery of the roller-wheel.

3. In a traction engine, the combination with a frame, of a front and rear support carried by the frame, each support having a ball member, a member disposed intermediate said supports, said member having socket portions in connection with said ball members and being pivotally movable from said ball and socket connections in a plane transverse to said frame, a roller-yoke pivotally mounted in said intermediate member on a vertical axis, and a roller-wheel journaled in said roller-yoke.

4. In a traction engine, the combination with a frame, of two ball members carried by the frame and spaced longitudinally at the center thereof, a member interposed between said ball members, having socket members in connection with said ball members and having a vertically disposed journal bearing positioned above said socket members, a roller-yoke pivotally mounted in said journal-bearing, and a roller-wheel journaled in said roller-yoke.

5. In a traction engine, the combination with a frame, of two ball members carried by the frame and spaced longitudinally at the center thereof, an inverted U-member interposed between said ball-members, having at the end of each of its arms a socket in connection with said ball-members and at its crotch a journal bearing having a vertical axis, a roller-yoke journaled in said bearing, and a roller-wheel in connection with said roller-yoke.

6. In a traction engine, the combination with a frame, of two bearings carried rigidly by the frame spaced longitudinally at the center thereof on horizontal axes, a member interposed between and mounted upon said bearings and having a journal bearing at its center portion with a vertical axis, said member capable of a pivotal movement from said spaced bearings in a plane transverse to the frame, a roller-yoke mounted in said journal bearing, and a roller-wheel in connection with said roller-yoke.

7. In a traction engine, the combination of a frame, of two bearings carried rigidly by the frame spaced longitudinally at the center thereof on horizontal axes, an inverted U-member interposed between said bearings, having each of its arms in connection with one of said bearings and having a journal bearing at its crotch with a vertical axis, the U-member capable of a pivotal movement from said bearings in a plane transverse to the frame, a roller-yoke mounted in said journal bearing, and a roller-wheel in connection with the roller-yoke.

8. In a traction engine, the combination with a frame comprising two longitudinal channel-beams, a support connecting the front ends of the beams and having a depending strut with a horizontal axis bearing at its lower end, a cross-support fastened to the beams at the rear of said front support and having a depending strut with a horizontal axis bearing at its lower end, a member interposed between said struts, mounted in said bearings and being capable of a pivotal movement therefrom in a plane transverse to the frame, a roller-yoke journaled on a vertical axis on said pivotal member, and a roller-wheel in connection with said roller-yoke.

9. In a traction engine, the combination with a frame, two ball members carried rigidly thereby spaced longitudinally at the center thereof, a member interposed between said ball members, having socket members in connection therewith and having a journal bearing with a vertical axis, a king-bolt mounted in said journal bearing, a roller-yoke in connection with said king-bolt, and a roller-wheel journaled in said roller-yoke.

10. In a traction engine, the combination with a frame, of a roller-wheel, a support carried by the wheel, a longitudinally disposed member pivotally connected on a vertical axis to said support above the roller-wheel and having socket members formed at its ends, and ball members fixedly carried by the frame and located in said socket members.

11. In a traction engine, the combination of a main frame, means connected to the front portion thereof for mounting an axle to turn on a vertical axis, means substantially similar to the first named means and mounted at the rear thereof on said frame, a road-roller wheel, and means mounted on the frame-connected means to turn on a horizontal axis and providing mounting intermediate the said frame-connecting means for the road-roller wheel to turn on a vertical axis.

12. In a traction engine, the combination of a pair of standards depending from the frame spaced apart in alinement with the longitudinal axis of the frame, a member interposed between said standards and mounted thereon to turn on a horizontal axis parallel with the longitudinal axis of the frame, and a road-roller wheel yoke journaled on said member on a vertical axis intermediate said standards and above the horizontal axis thereof.

13. In a traction engine, the combination of a frame, a pair of supports depending rigidly therefrom spaced apart in alinement with the longitudinal axis of the frame and each support having a ball-member at its lower end, a rigid frame interposed between said supports, mounted on the lower ends thereof by ball-and-socket connections and having a journaled bearing located above said connections on a vertical axis, a road-roller wheel, and a yoke therefor journaled in the said bearing of the intermediate frame.

14. In a traction engine, the combination of a frame, a rigid support depending from the forward end of the frame and having at its lower end a ball-member upon which a wheel-axle is adapted to be mounted by a ball-and-socket connection, and means in ball-and-socket connection with said ball-member and having a journaled-bearing located above said ball-member on a vertical axis and providing mounting for a road-roller-wheel yoke.

15. In a traction engine, the combination of a main frame having a rigid structure depending centrally from its forward end and providing means upon which a wheel-axle may be mounted to turn on a vertical axis, a rigid structure depending from the frame at the rear of said front structure, means interposed between and mounted upon said structures to turn on a horizontal axis parallel with the longitudinal axis of the main frame, said means having a journaled-bearing located above said axle-mounting of the front structure on a vertical axis, a road-roller-wheel yoke journaled in said vertical axis bearing, and a road-roller wheel interposed between and journaled upon the sides of said yoke.

16. In a traction engine, the combination of a frame, and mounting for a road-roller-wheel yoke comprising a yoke extending parallel with the longitudinal axis of the frame, the ends of the yoke being pivotally mounted on horizontal axes in alinement with said frame axis, the cross-portion of the yoke having a vertical-axis journal-bearing wherein a road-roller-wheel yoke may be journaled.

In testimony whereof I have hereunto set my hand in presence of two subscribing witnesses.

EDWARD RUSSELL GREER.

Witnesses:
CARL FREDRICK NELSON,
JOHN F. McCANNA, Jr.

Copies of this patent may be obtained for five cents each, by addressing the "Commissioner of Patents, Washington, D. C."